United States Patent [19]

King et al.

[11] Patent Number: 4,668,027
[45] Date of Patent: May 26, 1987

[54] SYSTEM FOR STORING AND DISPENSING MAGNETIC TAPE CARTRIDGES

[75] Inventors: Ronald R. King, Millbury; Norman C. May, Sr., Shrewsbury, both of Mass.

[73] Assignee: Wright Line Inc., Worcester, Mass.

[21] Appl. No.: 729,364

[22] Filed: May 1, 1985

[51] Int. Cl.⁴ ............................................. A47B 81/06
[52] U.S. Cl. ...................................... 312/13; 312/15; 206/387
[58] Field of Search ...................... 211/40; 312/13, 14, 312/15, 16, 17; 206/387; 16/DIG. 13

[56] References Cited

U.S. PATENT DOCUMENTS

| | | | |
|---|---|---|---|
| 1,117,118 | 11/1914 | Weis | 312/13 |
| 1,352,684 | 9/1920 | Ostendorf | |
| 2,475,495 | 7/1949 | Haag | 312/15 |
| 3,316,039 | 4/1967 | Drobny | 312/20 |
| 3,391,792 | 7/1968 | Mahar | 312/13 X |
| 3,994,550 | 11/1976 | Ackeret | 312/319 |
| 4,087,138 | 5/1978 | McRae | 312/15 |
| 4,109,821 | 8/1978 | Lutz | 16/DIG. 13 X |
| 4,241,955 | 12/1980 | Armistead | 312/12 |
| 4,330,162 | 5/1982 | Aboussouan | 312/15 |

OTHER PUBLICATIONS

"Cartridge System Tape and Handling/Storage Equipment for the IBM 3480", A Magnetic Tape Subsystem publication of IBM, Princeton, N.J. 08540.

Primary Examiner—Carl D. Friedman
Attorney, Agent, or Firm—Hamilton, Brook, Smith & Reynolds

[57] ABSTRACT

A system for storing and dispensing a magnetic tape cartridge having a pivotal storage cell (14) which includes a cartridge-discharge end and a cartridge-abutting end. A support (12) is located beneath the cell and pivot means (16) are located intermediate the ends of the cell to permit the cell to pivot on the support means relative to the horizontal. Means are provided to limit the amount of pivotal movement of the cell relative to the horizontal. The center of gravity of the cell is located closer to the cartridge-abutting end than to the cartridge-discharge end so that the cartridge abutting end of the bottom of the cell normally occupies a lower position relative to the horizontal than the discharge end and a cartridge in the bottom of the cell is inclined downwardly against the abutting end of the cell.

32 Claims, 21 Drawing Figures

SYSTEM FOR STORING AND DISPENSING MAGNETIC TAPE CARTRIDGES

FIELD OF THE INVENTION

This invention relates to storing and dispensing systems in general and more specifically to a system for storing and dispensing magnetic tape cartridges.

BACKGROUND OF THE INVENTION

For years, the accepted state-of-the-art means for supplying digital magnetic tape to data processors and other users was the familiar 10½ inch reel of ferric oxide magnetic tape. The development of the IBM 3480 Magnetic Tape Subsystem which, utilizes a recording medium of chromium-dioxide magnetic particles on tape contained within compact, easy to handle cartridges, is rapidly making the 10½ inch tape reels obsolete. Not only is the chromium-dioxide magnetic tape technologically better than ferric oxide tape, but being stored in specially designed cartridges which are about 4 inches by 5 inches in size compared with the 10½ inch reels, has resulted in substantial space saving to users.

Libraries for tape cartridges are available in the form of conventional stationary pigeon hole stacks into which individual cartridges are slid and then removed for usage. Portable carts with pigeon holes are also available to transport a number of cartridges from the stacks to the data processing equipment.

It is one of the objects of this invention to provide a magnetic tape cartridge storing and dispensing system which is not only space economical but also adapted to dispense cartridges from a storage position to one wherein cartridges may be removed with a minimum of effort and time.

Holders or dispensers for magnetic tape cartridges, or cassettes as they are also called, are in existence today. One example is found in U.S. Pat. No. 4,087,138 to MacRay which discloses a dispensing cabinet for tape cassettes having a plurality of pigeon hole slots, each of which is provided with its own ejector to push a cassette out of its pigeon hole to a position where the cassette may be gripped by hand.

A similar pigeon hole storage device is disclosed in U.S. Pat. No. 4,330,162 to Aboussouan. Similar to the MacRay device, Aboussouan employs an individual ejector mechanism in each pigeon hole to forcibly urge a cassette from its storage position to one where it may be picked out of the pigeon hole.

Both the MacRay and Aboussouan storage means require a plurality of moving parts as well as a separate pigeon hole for each cartridge and cassette. This results in a relatively expensive device which would be cost prohibitive to large users of magnetic tape cartridges. The systems also require storage area for many large stacks holding hundreds of cartridges each.

It is another object of this invention to provide a magnetic cartridge storing and dispensing device which eliminates the need for both a pigeon hole and an ejector for each cartridge and permits the storage of a greater number of cartridges in less space.

DISCLOSURE OF THE INVENTION

The invention resides in a system for storing and dispensing a magnetic tape cartridge. It includes a storage cell for receiving, storing, and dispensing a cartridge. The cell has a front or cartridge-discharge end and a rear cartridge-abutting wall. Support means are located beneath the storage cell. There are pivot means located intermediate the ends of the cell to permit the cell to pivot on the support means relative to the horizontal. Means to limit the amount of pivotal movement of the cell relative to the horizontal are employed. The center of gravity of the cell is closer to the cartridge-abutting wall than to the cartridge discharge end so that the cartridge-abutting wall of the cell normally occupies a lower position relative to the horizontal than the cartridge-discharge end. A cartridge in the cell in the storage position is inclined downwardly against the abutting end of the cell.

A plurality of cells are aligned in a row in side-by-side relationship. The support means extends beneath the row of aligned cells. A plurality of rows of cells on their support means are contained within a frame which may be part of a library stack.

Restraining means are located at the discharge end of the cell to restrain the cartridge within the cell when the cartridge discharge end of the cell is pivoted below the horizontal. Means are provided at the discharge end of the cell for accepting manual pressure to tilt the discharge end below the horizontal to facilitate the removal of the cartridge.

The pivot means comprises a convex hub and a concave socket in pivotal mating engagement with the hub. The hub and the socket are located one each on the cell and the support means.

The above and other features of the invention including various novel details of construction and combinations of parts will now be more particularly described with reference to the accompanying drawings and pointed out in the claims. It will be understood that the particular system for storing and dispensing a magnetic tape cartridge is shown by way of illustration only and not as a limitation of the invention. The principles and features of this invention may be employed in varied and numerous embodiments without departing from the scope of the invention.

BEST MODE OF CARRYING OUT THE INVENTION

Figure 1:
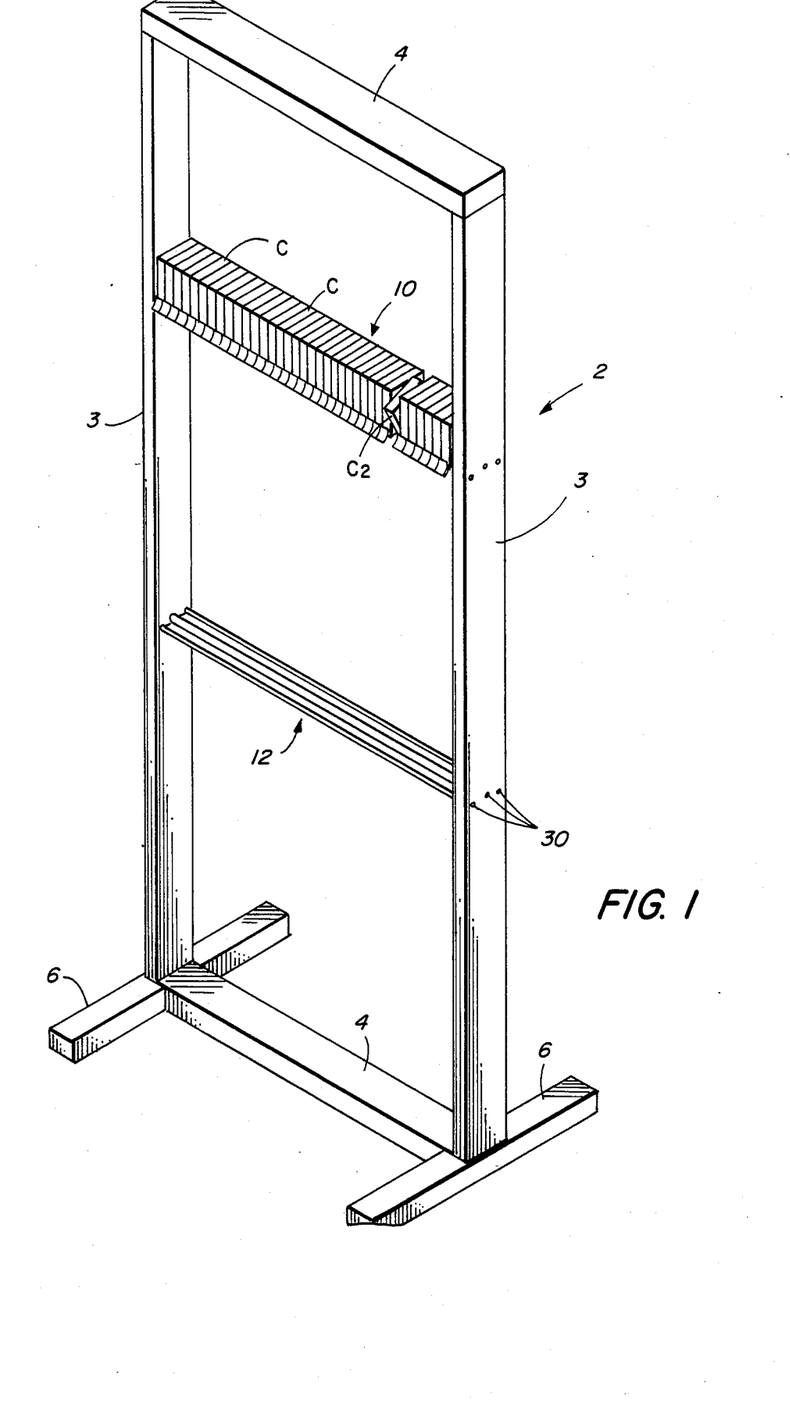
FIG. 1 is a perspective view of a library stack for storing and dispensing magnetic tape cartridges in accordance with the invention.

In FIG. 1 there will be seen a portion of a library stack in the form of a frame 2 comprising upright members 3, horizontal members 4, and supporting feet 6. It will be appreciated that the frame 2 is illustrative of not only a portion of a library stack but also a free-standing member or even the frame portions of a mobile cart which is employed for transporting cartridges C from a library to data processing equipment which will utilize the cartridges.

Cartridges are stored side-by-side in horizontal rows 10, only one of which is shown in FIG. 1. Cartridges C are pivotal relative to the horizontal on support means 12 (only one of which is shown in FIG. 1). It will be understood that there are a plurality of horizontal rows 10 of support means 12 mounted within the frame 2.

Figure 2:
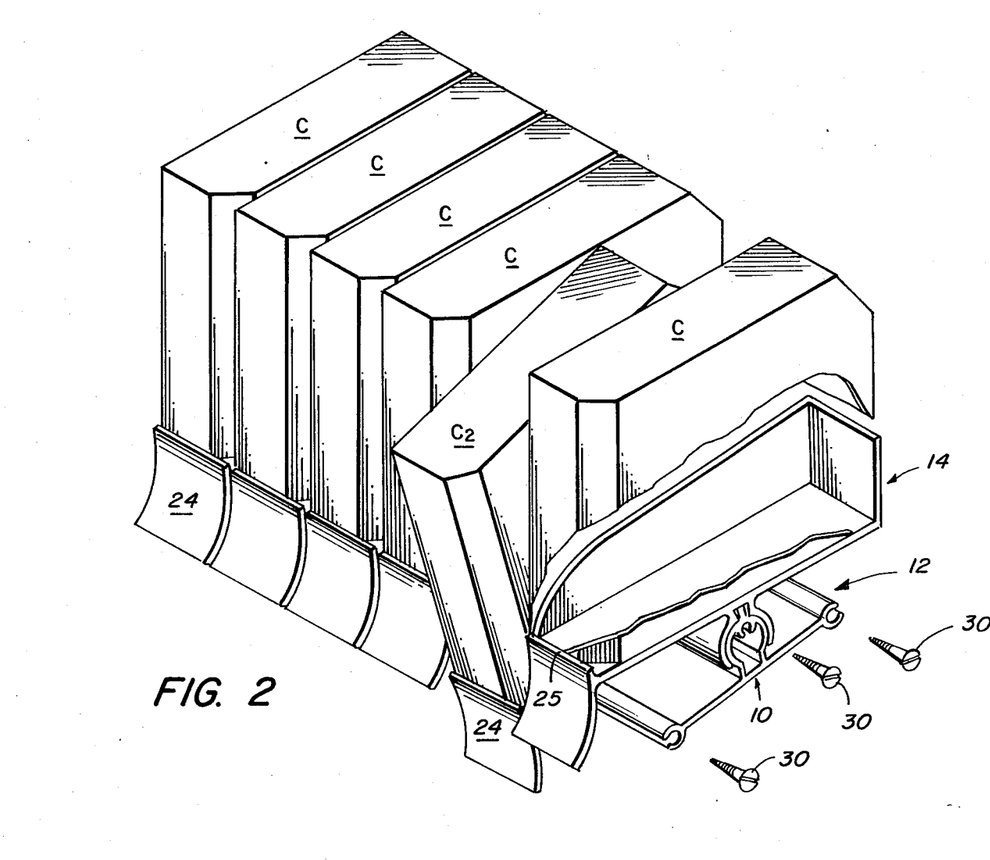
FIG. 2 is perspective view of a partial row of magnetic tape cartridges in cells on their support means.

As seen in FIG. 2, each cartridge C is contained within a cell 14, the end most cartridge being broken away to expose the cell. The cell 14 is pivotal relative to the horizontal on the support means 12, by cooperative pivot means 16 which will be described in greater detail hereinafter. One cartridge $C_2$ is in the discharge or dispensing position, its cell being tilted downwardly on the support 12 where the upper exposed corner of the cartridge $C_2$ may be conveniently gripped and removed from the cell. The remaining cartridges C are shown in their normal or cartridge storing position. When each cell is in its storing position, the cartridge abuts the rear wall of the cell and when the cell is tilted to the discharge position, the cell slides forwardly slightly, shifting the center of gravity of the combined cell and cartridge foward until the cartridge abuts the retaining means at the discharge end as will be described in more detail hereinafter. The cell and its cartridge remain in this postion until the cartridge is removed. Thereafter, the empty cell tilts rearwardly due to the location of its center of gravity.

Figure 3:
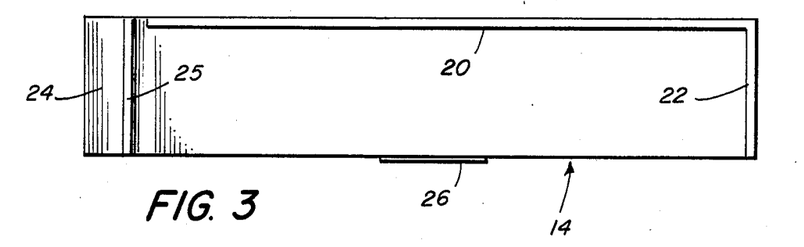
FIGS. 3 through 6 are top, side, front, and back views, respectively, of one embodiment of a cartridge storing cell mode in accordance with the invention.
Figure 4:
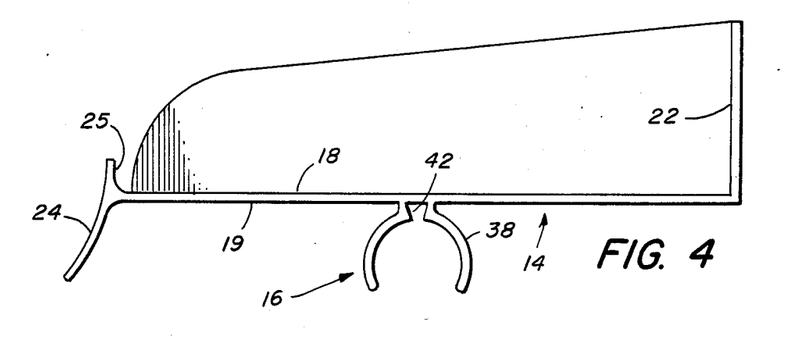

One embodiment of an illustrative cartridge storing and dispensing cell 14 is shown in FIGS. 3 through 6. The cell 14 which may be made of high impact styrene, or the like, has a flat cartridge engaging bottom 18, a bottom surface 19, a vertical side wall 20, a rear wall 22, which will be seen at the righthand side as seen in FIGS. 3 and 4 and which is also known as the rear or cartridge abutting end of the cell. The lefthand end of the cell 14 as viewed in these figures is known as the cartridge-discharge end.

Located at the cartridge-discharge end of the cell is an arcuate member 24 which may be pressed by a finger to tilt the cell from its normal cartridge storing position, in which the cartridge-abutting end of the cell is tilted downwardly and lower than the horizontal to the cartridge discharge position where the discharge end is lower than the horizontal. The pressure accepting means 24 may accept means on its surface such as a label or decal for identifying the the cartridge stored within the cell.

The cell includes a rib or wall 25 extending upwardly from the bottom 18 across its front or cartridge-discharge end. This serves as a cartridge restraining means to prevent the cartridge C from sliding out of the cell when the cell is tilted to the discharge position.

Figure 5:
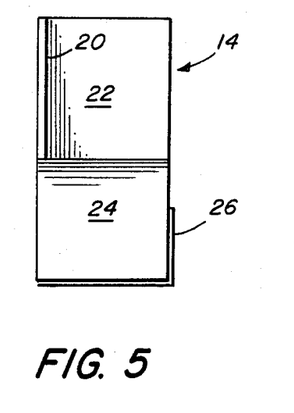
Figure 6:
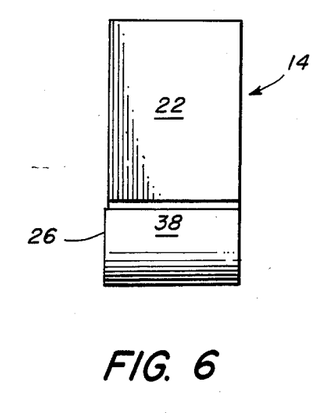

The pivot means 16, which is located beneath the cell, is shown extending from one side of the cell to the other. It projects slightly forming a projection 26 on side as seen in FIGS. 5 and 6. In assembled relationship, the hub 26 engages the pivot means of the next adjacent cell and acts as a lateral bearing to maintain a slight vertical spacing between the side wall 20 of one cell and the cartridge C held within the next adjacent cell.

Figure 7:
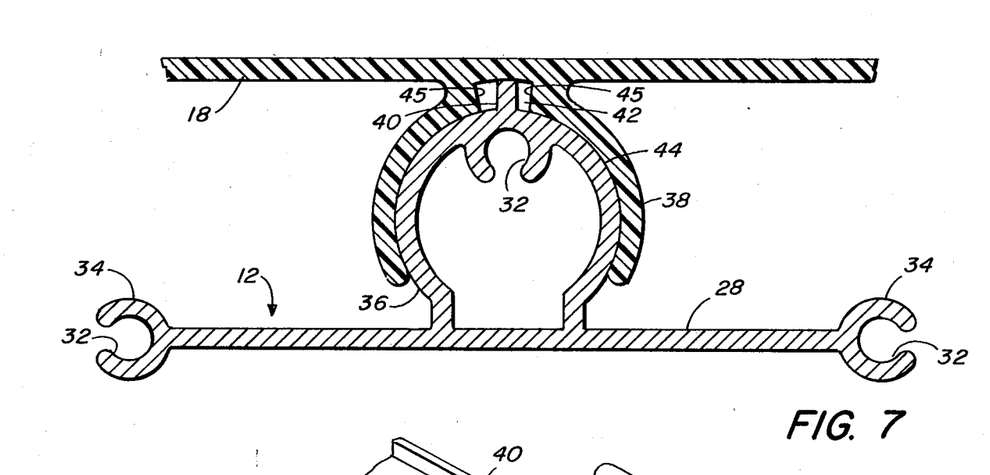
FIG. 7 is a sectional view, on enlarged scale, of a portion of the cell which is shown in FIGS. 3 through 6 and its supporting means.
Figure 8:
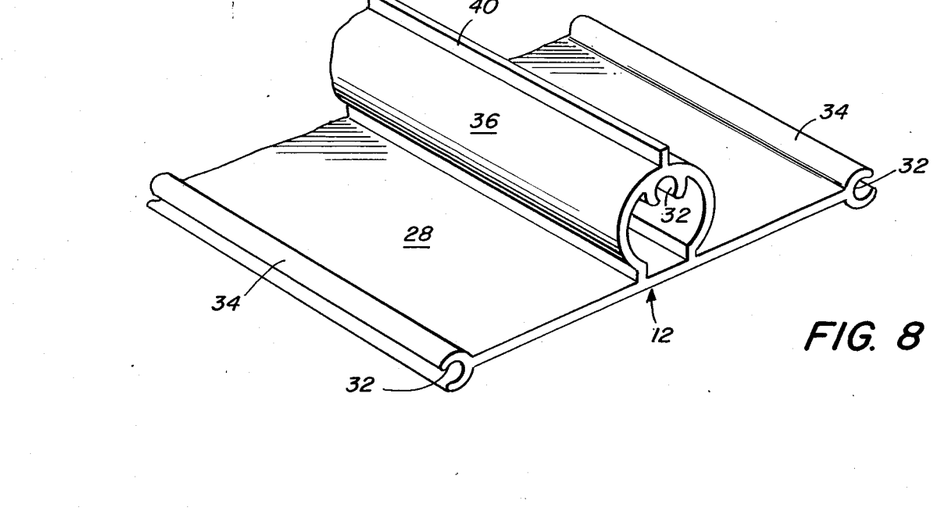
FIG. 8 is a perspective view of a portion of the cell support means employed with the cell shown in FIGS. 3 through 6.

Referring next to FIGS. 7 and 8, one embodiment of the pivot means 16 for allowing each cell to pivot relative to the support means 12 will now be described. The support means 12 comprises a substantially flat, horizontal plate 28 which may be made of extruded aluminum or the like. In assembled position within the frame, it extends horizontally from side to side as shown in FIG. 1. It is secured in the frame by screws 30 which are threaded into openings 32 formed in elongate, hollow C-shaped tubes 34 running lengthwise of the plate 28. Extending upwardly and running lengthwise of the plate 28 is an arcuate elongate bearing 36 having a convex circular circumference. When considered in cross section, the bearing 36 is the ball or hub of a ball-and-socket bearing. An upstanding rib or tongue 40 extends upwardly and lengthwise of the bearing 36.

The socket portion 38 of the pivot means 16 is a convexed interior, circular, C-shaped tube on the bottom of the cell 14. Its circumferential dimension is greater that a semicircle. A keystone shaped opening 42 is formed in the tubular socket 38 and receives the upstanding tongue 40. Since the cell 14 is made of high impact styrene, or the like, and the support means of extruded metal such as aluminum, when the parts are assembled, the socket 38 is snapped over and engages the circular outer surface 44 of the hub-like portion of the tubular bearing 36. The cell, therefore, remains in close but removable contact with the bearing 36 and is pivotal on the bearing relative to the horizontal. The walls 45 of the keystone opening 42 limit the angular pivotal motion of the cell on the bearing by engaging the rib. The limits of angular pivotal movement are from about 4° to about 8° degrees clockwise relative to the horizontal and from 8° to about 12° degrees counter-clockwise from the horizontal is viewed in FIG. 7.

It is important to note that each cell 14 is constructed with its center of gravity located closer to the cartridge-abutting end of the cell, i.e., the rear wall 22, than it is to the cartridge-discharge end, i.e., the pressure accepting means 24. As a result, the cartridge-abutting end of the cell normally occupies a lower position relative to the horizontal than the discharge end and a cartridge in the cell is inclined downwardly toward and rests against the cartridge abutting wall 22. To remove a cartridge from its cell, a person will lightly depress the member 24 tilting the cartridge discharge end downwardly relative to the horizontal at which time the cartridge, which is slightly smaller lengthwise than the cell, will slide forward slightly against the restraining means 25. The shifting of the cartridge shifts the combined center of gravity of the cartridge and its cell forward. The cell and cartridge remain in the forward or discharge position until the cartridge is picked off for usage.

Once a cartridge has been removed, since the center of gravity is closer to the cartridge-abutting end of the cell than the discharge end, it will tilt back into its original position whereby any labeling or cartridge identifying means on the member 24 is fully visible.

It will be appreciated that, were it desired that the cells remain in their cartridge-discharge position, i.e., tilted downwardly in front as is the cell which holds cartridge $C_2$, they would be constructed with their centers of gravity located closer to the cartridge-discharge end than the cartridge-abutting end, i.e., between the pivot means 16 and the retaining wall 25 as distinguished from being between the pivot means 16 and the cartridge-abutting rear wall 22.

Figure 9:
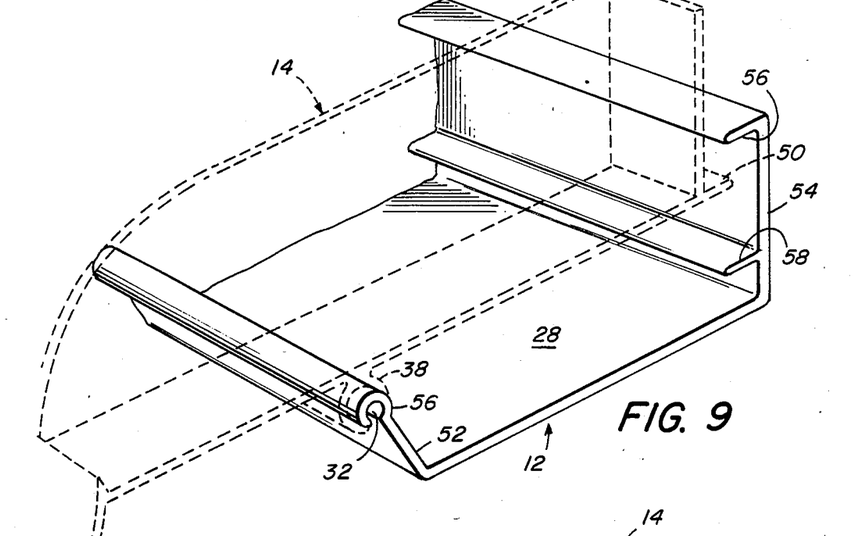
FIGS. 9 through 11 are perspective, side and rear views, respectively, of another embodiment of the cell and its support means.
Figure 10:
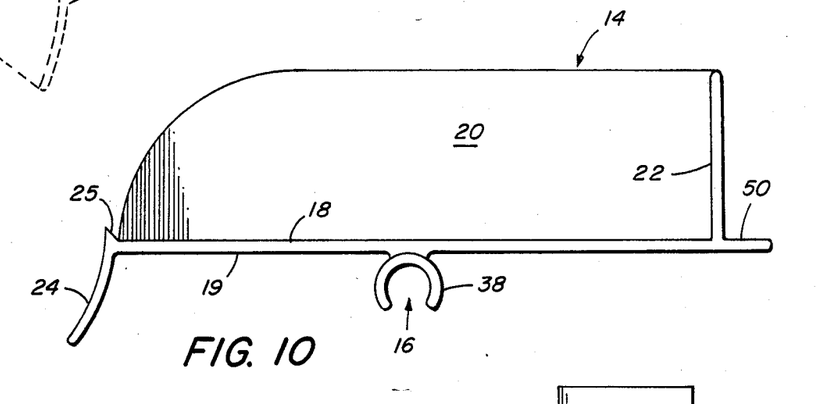
Figure 11:
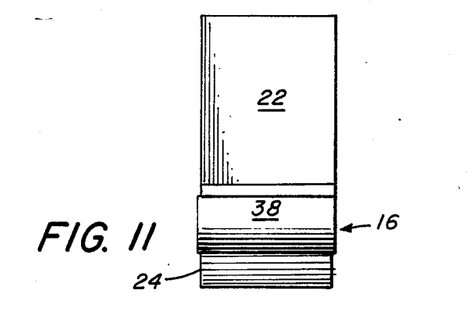

An alternate form of construction of the cell 14 and the support means 12 is shown in FIGS. 9, 10, and 11. Cell 14 is similar to the cell shown in FIG. 4 but does not utilize the keystone-shaped opening 42 and tongue 40 which serve as the pivot limiting means. The cell of FIG. 9 includes a rearwardly extending flange 50 projecting from the lower edge of the exterior of rear wall 22 where it joins the bottom of the cell 14. The support means 12 comprises a flat elongate plate 28 and an upwardly inclined front wall 52. It has a vertical rear wall 54 running lengthwise of the support. This wall may be screwed or otherwise secured to the back of the frame 2. The upwardly inclined front wall terminates in a question-mark shaped bearing member 56 over which, the bearing member 38 of each cell in the row is snapped. When the cell is assembled to the support, the flange 50 of the cell is located between an upper 56 and a lower 58 restraining plate projecting horizontally from the rear wall 54 of the support means 12.

When assembled as shown in FIG. 9, the downward pivoting motion of the cell 14 is restricted when the flange 50 engages the plate 58. This determines the cartridge-storing positon. In like manner, when the pressure means 24 is depressed and the cell pivoted into the cartridge discharge position, the movement is limited when the flange 50 abuts the under surface of the plate 56. In all other respects, the cell and its support means operate like the FIG. 4 configuration; the center of gravity is closer to the cartridge-abutting end than to the cartridge discharge end.

Figure 12:
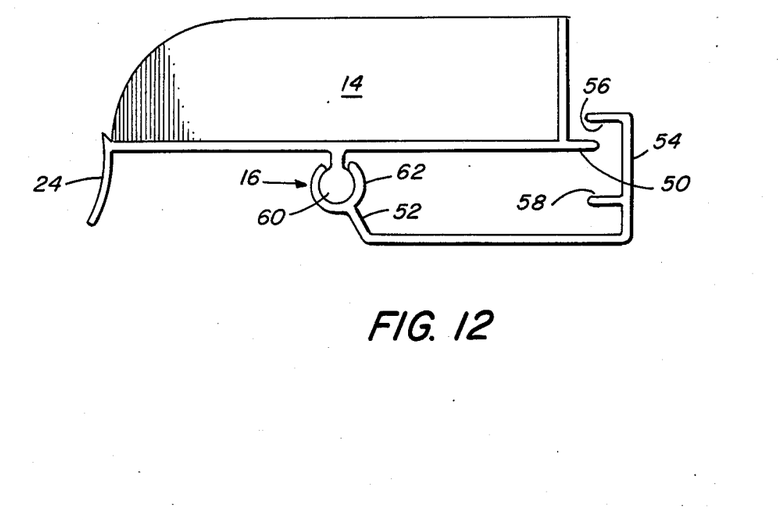
FIG. 12 is a side view of another embodiment of the cell and its support means.
Figure 13:
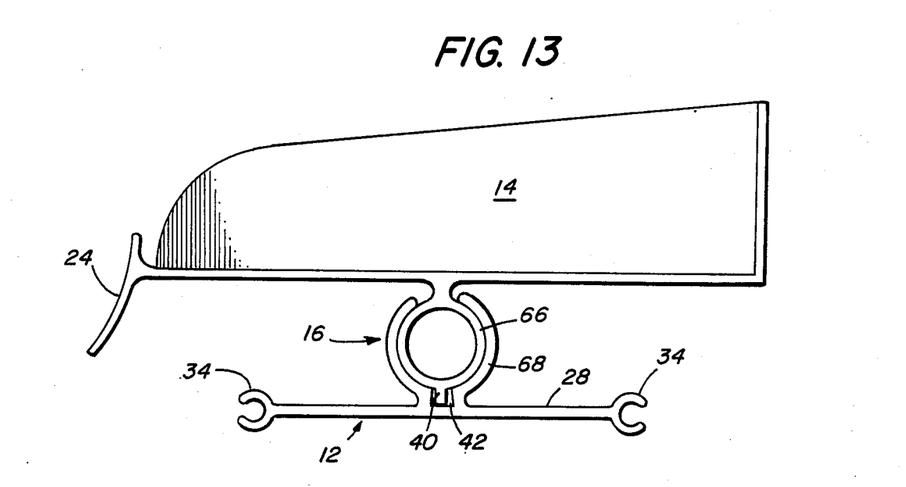
FIG. 13 is a side view of still another embodiment of the cell and its support means.

FIGS. 12 and 13 disclose additional embodiments in the invention where the ball or hub portion of the pivot means 16 is part of the cell and the socket portion is part of the supporting means 12. As seen in FIG. 12, depending from the central portion of the cell 14 is a cylinder 60 which, in the FIG. 12 cross section is shown as a circle. The upwardly inclined plate 52 on the plate 28 mounts an elongate tubular oar-lock shaped socket 62 which receives the hub portion 60 of each of the side-by-side cells. 14. The pivot controlling means is similar to that shown in FIG. 9 comprising a flange 50 extending from the cell and the two restraining plates 56 and 58 on the support means. The mechanism operates in the same manner as above described with respect to the other embodiments.

The FIG. 13 embodiment is similar to that shown FIG. 4. However, the hub portion of the pivot means 16 is part of the cell and the socket portion part of the support plate 28. The hub is a hollow tube 66 and the socket is a elongate tubular member 68 extending lengthwise the plate 28. The pivotal motion limiting means comprises a keystone-shaped slot 42 running lengthwise of the lower central portion of the socket member 68, the walls of the keystone slot 42 engage the walls of a tongue 40 projecting downwardly from the tubular member 66 of each cell 14 as in the FIG. 4 embodiment, but with the parts reversed in direction with respect to the vertical.

Figure 14:
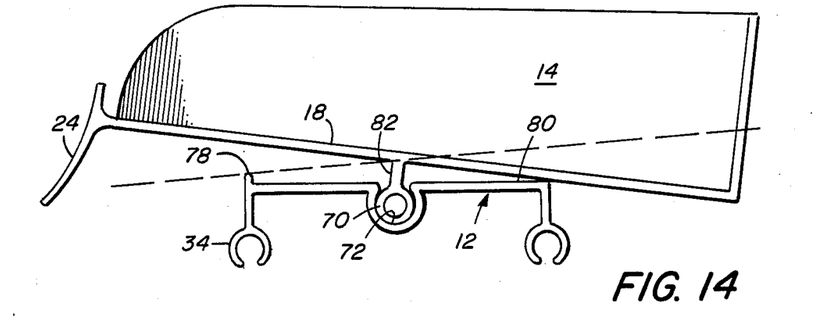
FIG. 14 is a side view of yet another embodiment of the cell and its support means.
Figure 15:
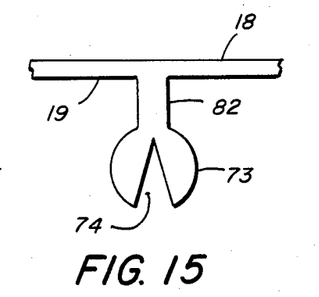
FIGS. 15 and 17 are side views of variations of the embodiment of FIG. 14.
Figure 16:
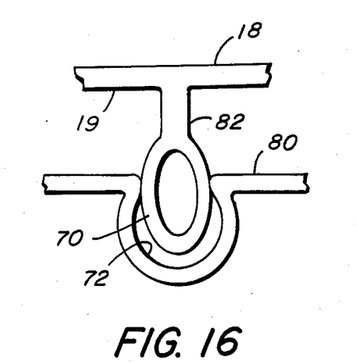
FIG. 16 is a side view of a portion of the embodiment of Fig. 14 showing a portion of a cell being connected to its support means.
Figure 17:
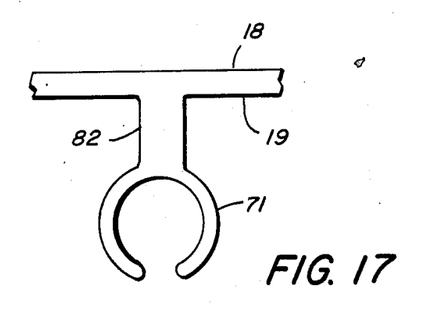

FIGS. 14 through 17 illustrate still another embodiment of the invention. Cell 14 is similar to that disclosed in the FIG. 4 embodiment and includes a depending hub 70 as the male portion of the pivot means. It may be either a solid bar 60 as shown in FIG. 12, a hollow bar 70 as shown in FIG. 14, or a substantially inverted C or oar-lock shaped bar 71 as shown in FIG. 17. The support means 12 includes elongate members 34 with the openings 32 for securing the support means 12 to the frame 2. Intermediate its ends is an elongate socket 72 extending its entire length. To assemble the cells on the support means, the tubular hub portion is compressed laterally as shown in FIG. 16 and inserted into the socket 72. Thereafter, it is allowed to expand to the configuration shown in FIG. 14. In the instance of the oar-lock shaped hub, it, too, is compressed laterally and inserted into the socket 72.

FIG. 15 shows an essentially solid hub member 73 with an inverted V-shaped slot 74 extending upwardly from its bottom. To assemble the elements of the pivot means, the hub 73 is compressed laterally slightly closing the slot 74 to permit it to enter the socket 72. Thereafter, the hub 73 expands to its circular configuration engaging the walls of the socket.

The pivot limiting means of the embodiment shown in FIG. 14 includes a ridge 78 running lengthwise of the support means 12 which engages the bottom surface 19 of the cell when the cell is pivoted to the cartridge-discharge position (shown in broken lines in FIG. 14). When the cell is in the cartridge retaining position, as shown in solid lines in FIG. 14, the bottom of the cell rests upon the upper surface 80 at the righthand edge of the support means 12. The length of the arm 82 which mounts the hubs 70, 71, and 73, controls the degree of pivotal motion, the longer the arm the greater the amount of pivotal motion. It will be noted that the top of the ridge 78 is higher than the surface 80. Thus, the cell is lower in the rear or the cartridge-storing position than it is in the front or cartridge-discharge position.

Figures 18, 19, 20:
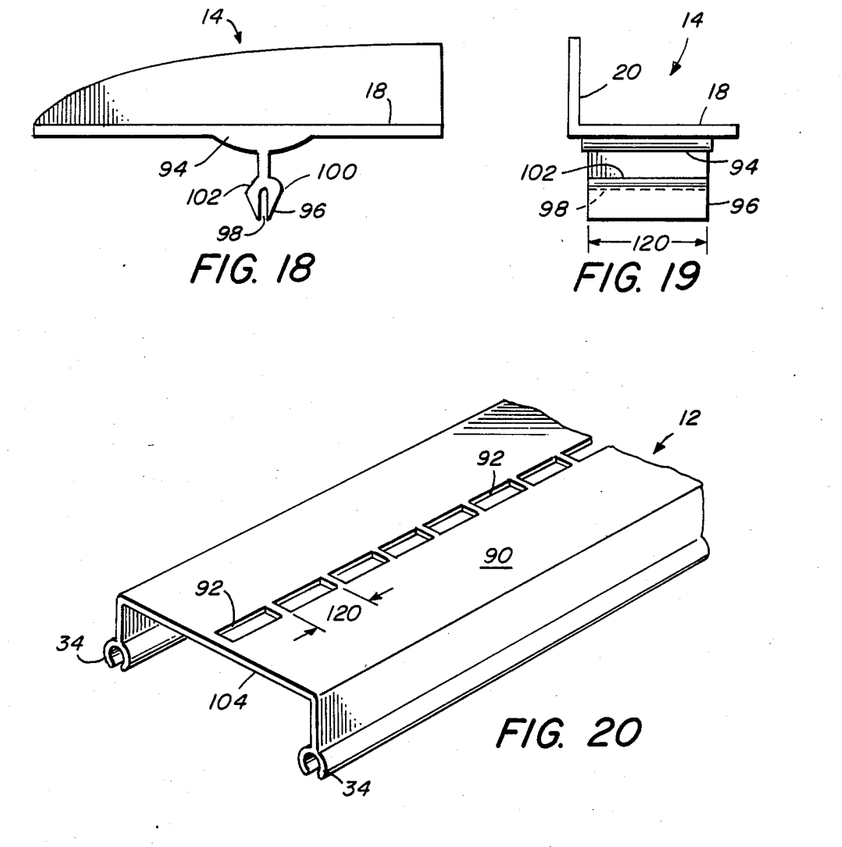
FIGS. 18 and 19 are a side and front view, respectively, of still another embodiment of the invention
FIGS. 20 and 21 are a perspective and a side view, respectively, of the support means for the pivot means shown in FIGS. 18 and 19.

Still another embodiment of the invention is shown in FIGS. 18 through 21. Referring to FIG. 20, the support means 12 includes a flat upper surface 90 through the center of which are a line of rectangular openings 92. As seen in FIG. 18, the bottom of the cell 14 includes an arcuate rocker member 94,. Downwardly extending from the rocker member is a retaining dart 96 having a slot 98 in its lower end to permit it to be compressed. The dart of each cell is compressed and inserted into one of the rectangular openings 92 in the support means 12, where it locks into assembled relationship. The rocker portion 94 pivots on the edges of the rectangular opening 92 at their intersection with the surface 90 of the support means 12. The retaining dart is eccentric. The righthand portion 100, as viewed in FIG. 18, is higher than the left hand portion 102. When the cell is in the cartridge storing position, the surface 102 abuts the under surface 104 of the support means and similarly when the cell is in the cartridge discharge position, the surface 100 abuts the surface 104 to accurately control the amount of desired angular pivoting relative to the horizontal as described above.

Figure 21:
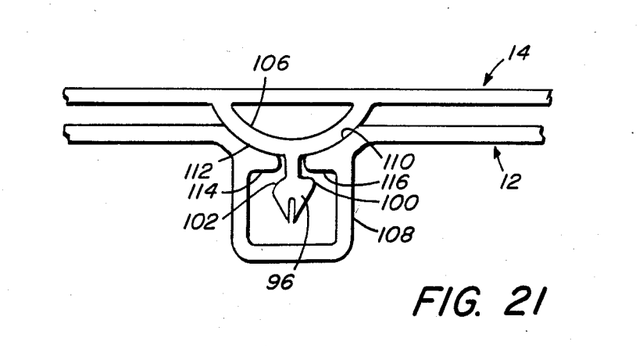

As seen in FIG. 21, the rocker portion on the bottom of the cell may be hollow as at 106. The support member 12 is provided with a depending housing 108 which is located beneath the openings 92 in the support means. The housing includes an arcuate bearing surface 110 which is engageable with the bearing surface 112 of the rocker 94. The surfaces 100 and 102 of the dart rather than engaging the under surface 104 of the support means 12, engage shoulders 114 and 116 of the housing 108.

As seen FIG. 19 the width of the rocker 24 and dart, is designated 120 and would be constructed slightly less than the longitudinal width of each slot in the support means. The cell is thus retained lengthwise of the support means by the ends of the openings 92. This permits each cell to be independently removed from the support means without disturbing the position of the next adjacent cells should the cell, for example, require cleaning or replacement.

We claim:

1. A system for storing and dispensing rectangular objects such as magnetic tape cartridges comprising:
    a plurality of storage cells aligned in a row in side-by-side relationship, each cell having a front cartridge-discharge end, a rear cartridge-abutting wall, one side wall and a single flat bottom,
    support means beneath the aligned storage cells,
    the support means being a substantially flat, horizontal plate having elongate tubes extending lengthwise of the plate for receiving securing means to assemble the plate to a frame,
    pivot means to permit each cell to pivot on the support means relative to the horizontal,
    the pivot means being a pivotal joint having a convex member and a concave member, one of said members being a part of each cell and the other member being a single part of the support means and common to all cells when the cells are arranged in side-by-side relationship,
    means to limit the amount of the pivotal motion of each cell relative to the horizontal, the center of gravity of each empty cell being closer to the cartridge-discharge end than to the cartridge-abutting wall,
    whereby the cartridge-discharge end of each empty cell normally is inclined to tilt downwardly relative to the cartridge-abutting wall until restrained by the limit means.

2. A cartridge storing and dispensing system according to claim 1 wherein there are arcuate means at the cartridge-discharge end of the cell for accepting manual pressure to tilt the cell relative to the horizontal to facilitate the removal of the cartridge.

3. A cartridge storing and dispensing system according to claim 1 wherein the pivot means comprises a convex hub and a concave socket in sliding mating engagement with the hub and the means to limit the amount of pivotal motion of the cell relative to the horizontal is a keystone shaped slot and a rectangular tongue, moveable within the confines of the slot, the slot and tongue being formed, one each on the hub and socket.

4. A cartridge storing and dispensing system according to claim 1 wherein the means for limiting the amount of pivotal movement of the cell relative to the horizontal comprises a pair of fixed, vertically spaced restraining members adjacent the cartridge-abutting wall of the cell and a flange projecting from the cartridge-abutting wall end of the cell and the confines of the restraining means.

5. A cartridge storing and dispensing system according to claim 1 wherein the means for limiting the amount of pivotal movement of the cartridge-discharge end of the cell relative to the horizontal comprises a projecting abutment on the support means engageable with the bottom surface of the cell adjacent the cartridge-discharge end and the amount of downward pivotal movement of the cartridge-abutting wall of the cell being limited by engagement between the bottom surface of the cell and the upper surface of the support means.

6. A system for storing and dispensing rectangular objects such as magnetic tape cartridges comprising:
    a plurality of storage cells aligned in side-by-side relationship in a row, each cell having a front cartridge-discharge end a rear cartridge-abutting wall, one side wall and a single flat bottom,
    horizontally extending support means beneath the row of aligned storage cells,
    the support means being a substantially flat, horizontal plate,
    pivot means to permit each cell to pivot relative to the horizontal and transversely of the support means,
    the pivot means being a pivotal joint having a convex member and a concave member, one of said members being a part of each cell and the other member being a single part of the support means and common to all cells when the cells are arranged in side-by-side relationship,
    the center of gravity of each cell being closer to the cartridge-discharge end than to the cartridge-abutting wall,
    whereby the cartridge-discharge end of the empty cell normally is inclined to tilt downwardly relative to the cartridge-abutting wall,
    means at the cartridge-discharge end of each cell for excepting manual pressure to tilt the cartridge-discharge end upwardly relative to the horizontal,
    said pressure accepting means being a member having an arcuate surface extending transversely of the cartridge-discharge end of each cell above and below the bottom of the cell, the portion of the member extending above the cell being a ridge which is engageable with a cartridge in the cell, and
    the arcuate surface being adapted to receive identifying indicia.

7. A cartridge storing and dispensing system according to claim 6 wherein the pivot means comprises a convex hub and a concave socket in sliding mating engagement with the hub and the means to limit the amount of pivotal motion of the cell relative to the horizontal is a keystone shaped slot and a rectangular tongue, moveable within the confines of the slot, the slot and tongue being formed, one each on the hub and socket.

8. A system for storing and dispensing a magnetic tape cartridge or the like comprising:
    a storage cell for receiving a cartridge, the cell having a front cartridge-discharge end and a rear cartridge-abutting wall, one side wall and a single flat bottom,
    support means beneath the storage cell,
    pivot mean located intermediate the ends of the cell to permit the cell to pivot on the support means relative to the horizontal,
    the pivot means comprising a convex, elongated, horizontal hub beneath the bottom of the cell and extending parallel to the rear wall in releasable engagement with a concave, horizontal, socket in the support means extending parallel to the rear wall of the cell, means on the support means to limit the amount of pivotal movement of the cell relative to the horizontal, the center of gravity of the empty cell being closer to the cartridge-discharge end than to the cartridge-abutting wall, whereby the cartridge-discharge end of the empty cell normally is induced to tilt downwardly relative to the cartridgeabutting wall until restrained by the limit means.

9. A cartridge storing and dispensing system according to claim 8 wherein there are arcuate means at the cartridge-discharge end of the cell for accepting manual pressure to tilt the cell relative to the horizontal to facilitate the removal of the cartridge.

10. A cartridge storing and dispensing system according to claim 8 wherein there are a plurality of rows of cells in side-by-side relationship on the support means.

11. A cartridge storing and dispensing system according to claim 8 wherein the means for limiting the amount of pivotal movement of the cell relative to the horizontal comprises a pair of fixed, vertically spaced restraining members adjacent the cartridge-abutting wall of the cell and a flange projecting from the cartridge-abutting wall end of the cell and the confines of the restraining means.

12. A cartridge storing and dispensing system according to claim 8 wherein the means for limiting the amount of pivotal movement of the cartridge-discharge end of the cell relative to the horizontal comprises a projecting abutment on the support means engageable with the bottom surface of the cell adjacent the cartridge-discharge end and the amount of downward pivotal movement of the cartridge-abutting wall of the cell being limited by engagement between the bottom surface of the cell and the upper surface of the support means.

13. A system for storing and dispensing a magnetic tape cartridge or the like comprising:

a storage cell for receiving a cartridge, the cell having a front cartridge-discharge end, a rear cartridge-abutting wall, one side wall and a single flat bottom, support means beneath the storage cell, the support means being a substantially flat, horizontal plate having elongate tubes extending lengthwise of the plate for receiving securing means to assemble the plate to a frame, pivot means located intermediate the ends of the cell to permit the cell to pivot on the support means relative to the horizontal, the pivot means comprising a convex, elongated, horizontal hub beneath the bottom of the cell and extending parallel to the rear wall in releasable engagement with a concave horizontal socket in the support means extending parallel to the rear wall, means to limit the amount of the pivotal movement of the cell relative to the horizontal, the center of gravity of the empty cell being closer to the cartridge-discharge end than to the rear wall, and the means for limiting the amount of pivotal movement cartridge-discharge end of the cell relative to the horizontal comprising a ridge on the support means engageable with the bottom surface of the cell adjacent to the cartridge-discharge end.

14. A cartridge storing and dispensing system according to claim 13 wherein there are arcuate means at the cartridge-discharge end of the cell for accepting manual pressure to tilt the cell relative to the horizontal to facilitate the removal of the cartridge.

15. A cartridge storing and dispensing system according to claim 13 wherein there are a plurality of rows of cells in side-by-side relationship on the support means.

16. A cartridge storing and dispensing system according to claim 13 wherein the means for limiting the amount of pivotal movement of the cartridge-discharge end of the cell relative to the horizontal comprises a projecting abutment on the support means engageable with the bottom surface of the cell adjacent the cartridge-discharge end and the amount of downward pivotal movement of the cartridge-abutting wall of the cell being limited by engagement between the bottom surface of the cell and the upper surface of the support means.

17. A system for storing and dispensing rectangular objects such as magnetic tape cartridges comprising:

a plurality of storage cells arranged in a row in side-by-side relationship, each cell having a front cartridge-discharge end, a rear cartridge-abutting wall, one side wall and a single flat bottom, support means beneath the aligned storage cells, the support means being a substantially flat, horizontal plate having elongate tubes extending lengthwise of the plate for receiving securing means to assemble the plate to a frame, pivot means to permit each cell to pivot on the support means relative to the horizontal, the pivot means being a pivotal joint having a convex member and a concave member, one of said members being a part of each cell and the other member being a single part of the support means and common to all cells when the cells are arranged in side-by-side relationship, means to limit the amount of the pivotal motion of each cell relative to the horizontal, the center of gravity of each empty cell being closer to the cartridge-abutting wall than to the cartridge discharge end, whereby the cartridge-abutting wall of each empty cell normally is inclined to tilt downwardly relative to the cartridge discharge end until restrained by the limit means.

18. A cartridge storing and dispensing system according to claim 17 wherein there are arcuate means at the cartridge-discharge end of the cell for accepting manual pressure to tilt the cell relative to the horizontal to facilitate the removal of the cartridge.

19. A cartridge storing and dispensing system according to claim 17 wherein the pivot means comprises a convex hub and a concave socket in sliding mating engagement with the hub and the means to limit the amount of pivotal motion of the cell relative to the horizontal is a keystone shaped slot and a rectangular tongue, moveable within the confines of the slot, the slot and tongue being formed, one each on the hub and socket.

20. A cartridge storing and dispensing system according to claim 17 wherein the means for limiting the amount of pivotal movement of the cell relative to the horizontal comprises a pair of fixed, vertically spaced restraining members adjacent the cartridge-abutting wall of the cell and a flange projecting from the cartridge-abutting wall end of the cell and the confines of the restraining means.

21. A cartridge storing and dispensing system according to claim 17 wherein the means for limiting the amount of pivotal movement of the cartridge-discharge end of the cell relative to the horizontal comprises a projecting abutment on the support means engageable with the bottom surface of the cell adjacent the cartridge-discharge end and the amount of downward pivotal movement of the cartridge-abutting wall of the cell being limited by engagement between the bottom surface of the cell and the upper surface of the support means.

22. A system for storing and dispensing rectangular objects such as magnetic tape cartridges comprising:
   a plurality of storage cells aligned in side-by-side relationship in a row, each cell having a front cartridge-discharge end a rear cartridge-abutting wall, one side wall and a single flat bottom,
   horizontally extending support means beneath the row of aligned storage cells,
   the support means being a substantially flat, horizontal plate,
   pivot means to permit each cell to pivot relative to the horizontal and transversely of the support means,
   the pivot means being a pivotal joint having a convex member and a concave member, one of said members being a part of each cell and the other member being a single part of the support means and common to all cells when the cells are arranged in side-by-side relationship,
   the center of gravity of each cell being closer to the cartridge-abutting wall, than to the cartridge-discharge end,
   whereby the cartridge-abutting wall of the empty cell normally is inclined to tilt downwardly relative to the cartridge-discharge end,
   means at the cartridge-discharge end of each cell for excepting manual pressure to tilt the cartridge-discharge end upwardly relative to the horizontal,
   said pressure accepting means being a member having an arcuate surface extending transversely of the cartridge-discharge end of each cell above and below the bottom of the cell, the portion of the member extending above the cell being a ridge which is engageable with a cartridge in the cell,
   the arcuate surface being adapted to receive identifying indicia.

23. A cartridge storing and dispensing system according to claim 22 wherein the pivot means comprises a convex hub and a concave socket in sliding mating engagement with the hub and the means to limit the amount of pivotal motion of the cell relative to the horizontal is a keystone shaped slot and a rectangular tongue, moveable within the confines of the slot, the slot and tongue being formed, one each on the hub and socket.

24. A system for storing and dispensing a magnetic tape cartridge or the like comprising:
   a storage cell for receiving a cartridge, the cell having a front cartridge-discharge end and a rear cartridge-abutting wall, one side wall and a single flat bottom,
   support means beneath the storage cell,
   pivot mean located intermediate the ends of the cell to permit the cell to pivot on the support means relative to the horizontal,
   the pivot means comprising a convex, elongated, horizontal hub beneath the bottom of the cell in releasable engagement with a concave, horizontal, socket in the support means extending parallel to the rear wall of the cell,
   means on the support to limit the amount of pivotal movement of the cell relative to the horizontal,
   the center of gravity of the empty cell being closer to the cartridge-abutting wall than to the cartridge-discharge end,
   whereby the cartridge-abutting wall of the empty cell normally is induced to tilt downwardly relative to the cartridge-discharge end until restrained by the limit means.

25. A cartridge storing and dispensing system according to claim 24 wherein there are arcuate means at the cartridge-discharge end of the cell for accepting manual pressure to tilt the cell relative to the horizontal to facilitate the removal of the cartridge.

26. A cartridge storing and dispensing system according to claim 24 wherein there are a plurality of rows of cells in side-by-side relationship on the support means.

27. A cartridge storing and dispensing system according to claim 24 wherein the means for limiting the amount of pivotal movement of the cell relative to the horizontal comprises a pair of fixed, vertically spaced restraining members adjacent the cartridge-abutting wall of the cell and a flange projecting from the cartridge-abutting wall end of the cell and the confines of the restraining means.

28. A cartridge storing and dispensing system according to claim 24 wherein the means for limiting the amount of pivotal movement of the cartridge-discharge end of the cell relative to the horizontal comprises a projecting abutment on the support means engageable with the bottom surface of the cell adjacent the cartridge-discharge end and the amount of downward pivotal movement of the cartridge-abutting wall of the cell being limited by engagement between the bottom surface of the cell and the upper surface of the support means.

29. A system for storing and dispensing a magnetic tape cartridge or the like comprising:
   a storage cell for receiving a cartridge, the cell having a front cartridge-discharge end, a rear cartridge-abutting wall, one side wall and a single flat bottom,
   support means beneath the storage cell,
   the support means being a substantially flat, horizontal plate having elongate tubes extending lengthwise of the plate for receiving securing means to assemble the plate to a frame,
   pivot means located intermediate the ends of the cell to permit the cell to pivot on the support means relative to the horizontal,
   the pivot means comprising a convex, elongated, horizontal hub beneath the bottom of the cell and extending parallel to the rear wall in releasable engagement with a concave horizontal socket in the support means extending parallel to the rear wall,
   means to limit the amount of the pivotal movement of the cell relative to the horizontal, the center of gravity of the empty cell being closer to the cartridge abutting rear wall than to the cartridge-discharge end, the means for limiting the amount of pivotal movement cartridge-discharge end of the cell relative to the horizontal comprising a ridge on the support means engageable with the bottom surface of the cell adjacent to the cartridge-discharge end.

30. A cartridge storing and dispensing system according to claim 29 wherein there are arcuate means at the cartridge-discharge end of the cell for accepting manual pressure to tilt the cell relative to the horizontal to facilitate the removal of the cartridge.

31. A cartridge storing and dispensing system according to claim 29 wherein there are a plurality of rows of cells in side-by-side relationship on the support means.

32. A cartridge storing and dispensing system according to claim 29 wherein the means for limiting the amount of pivotal movement of the cartridge-discharge end of the cell relative to the horizontal comprises a projecting abutment on the support means engageable with the bottom surface of the cell adjacent the cartridge-discharge end and the amount of downward pivotal movement of the cartridge-abutting wall of the cell being limited by engagement between the bottom surface of the cell and the upper surface of the support means.

* * * * *